US005862906A

United States Patent [19]

Von Wedel

[11] Patent Number: 5,862,906

[45] Date of Patent: Jan. 26, 1999

[54] GRATE PLATE ARRANGEMENT

[76] Inventor: Karl Von Wedel, Gerberhof 5, D-31535 Neustadt, Germany

[21] Appl. No.: 676,116

[22] PCT Filed: Nov. 15, 1995

[86] PCT No.: PCT/EP95/04495

§ 371 Date: Jun. 11, 1996

§ 102(e) Date: Jun. 11, 1996

[87] PCT Pub. No.: WO96/16306

PCT Pub. Date: May 30, 1996

[30] Foreign Application Priority Data

Nov. 17, 1994 [DE] Germany .......................... 44 41 009.3

[51] Int. Cl.[6] .......................... B65G 25/04; B65G 21/00; B65G 35/00

[52] U.S. Cl. .................................... 198/750.1; 198/750.2; 198/750.3; 198/860.3

[58] Field of Search ............................. 198/750.1, 750.2, 198/750.3, 860.3

[56] References Cited

U.S. PATENT DOCUMENTS

| | | | |
|---|---|---|---|
| 3,255,867 | 6/1966 | Allen et al. | 198/773 |
| 4,170,183 | 10/1979 | Cross | 198/773 |
| 4,320,710 | 3/1982 | Steiner et al. | 198/773 |
| 4,350,244 | 9/1982 | Heinemann et al. | 198/773 |
| 4,600,098 | 7/1986 | Orren | 198/773 |
| 5,346,056 | 9/1994 | Quaeck | 198/750.3 |
| 5,415,271 | 5/1995 | Foster | 198/750.3 |

FOREIGN PATENT DOCUMENTS

| | | | |
|---|---|---|---|
| 952 785 | 11/1956 | Germany . | |
| 3605010 | 8/1987 | Germany | 198/860.3 |
| 867221 | 5/1961 | United Kingdom | 198/204 |

OTHER PUBLICATIONS

The journal "Zement–Kalk–Gips", No. 4/1992 (45th Annual Edition)—9 pages.

*Primary Examiner*—William E. Terrell
*Assistant Examiner*—Joe Dillon, Jr.
*Attorney, Agent, or Firm*—Flynn, Thiel, Boutell & Tanis, P.C.

[57] ABSTRACT

This invention concerns a grate plate arrangement for step grates wherein a plurality of grate plates (2) can be laid side-by-side on to a grate carrier (2) and can each be fixed to the grate carrier by means of a respective clamping device (11) which engages the grate plate and the grate carrier. In this arrangement, the clamping device (11) includes at least one clamping element (12) whose end (14), which is towards the grate plate, engages through an opening (15) in a front end wall (3) of the grate plate (2). The clamping device has clamping means (16) which are actuable from the front end wall side. The other clamping element end, which is towards the grate carrier, is provided with anchoring means (13) for force-transmitting connection to the grate carrier. This arrangement makes it possible for the grate plates to be mounted or dismantled from the top side of the grate, so that the mounting operation can be performed in a more rational fashion and in a better manner from the point of view of maintenance, and industrial health and safety standards.

28 Claims, 4 Drawing Sheets

GRATE PLATE ARRANGEMENT

FIELD OF THE INVENTION

The invention concerns a grate plate arrangement for step grates.

More specifically the invention concerns a grate plate arrangement having a plurality of side-by-side grates fixed on a grate carrier by a clamping device.

BACKGROUND OF THE INVENTION

Grates of that kind serve for cooling or for other treatment of loose or bulk materials which are piled on to the grate and to which cooling air or another gas is fed from below through the grate surface which is provided with blowing openings.

The grate plates which are arranged in laterally side-by-side relationship on a grate carrier form a row of grates; the whole step grate includes a plurality of rows of grates which are arranged one behind the other in the longitudinal direction, with the grate plates of each row overlapping in scale-like relationship the grate plates of the next following row which adjoins same in a forward direction. In the case of step grates which are in the form of so-called pusher grates individual rows of grates can perform an oscillating movement in the longitudinal direction so that bulk material disposed on the grate is conveyed cyclically forwardly across the grate. Front end walls provided on the grate plates form-the respective rearward boundary of a step. The above-defined directional references such as 'laterally side-by-side', 'one behind the other in the longitudinal direction', 'in a forward direction' and the like are used in the same sense in the following description in relation to the grate and the individual grate plates.

A distinction is made between open grate plates and closed grate plates. Open grate plates essentially comprise the cover wall which forms the grate surface and which is provided with blowing openings, and a front end wall which is arranged thereon. In the case of closed grate plates the front end wall is part of a box-like structure which additionally includes a rear wall, side walls and a bottom wall which is provided with an opening for the feed of air.

In the case of non-conveying, fixed step grates the front end walls provided at the grate plates of a step can be supported on the top side of the next following row of grates so that here a harmful gap which affects the grate resistance and the material through-fall rate can be substantially avoided. In contrast, in the case of pusher grates, so-called pusher gaps must be provided between the end wall and the top side of rows of grates which are movable relative to each other in order to prevent wear at that location. The grate resistance and the amount of material which unintentionally drops through the grate inter alia depend on those gaps being calibrated accurately and as closely as possible. It is therefore a matter of great significance for the grate plates to be fixed on the associated grate carrier in such a way that the pusher gaps remain unchanged as far as possible, even under very high mechanical and thermal loadings.

The grate plates can be fixed to the grate carrier by clamping devices which engage on the one hand the grate plate and on the other hand the grate carrier and clamp the grate plate on to the grate carrier. Those clamping devices must in particular be capable of preventing the grate plates from lifting off in order particularly in the case of pusher grates to prevent a harmful increase in the size of the pusher gaps and thus an uncontrolled variation in the grate resistance and the material through-fall rate.

German patent specification No 952 785 describes a step grate which operates as a pusher grate and which uses open grate plates substantially comprising a cover wall and a front end wall. The clamping device includes a tie anchor which, with its end towards the grate plate, engages a hook arranged at the underside of the grate plate while, at its end towards the grate carrier, it passes through an opening formed in a grate carrier wall and is secured by means of screw nuts which can be screwed on to that end. FIGS. 5 and 6 in conjunction with FIG. 1 readily show that assembly of the grate plates is extremely difficult. The tie anchors of each individual grate plate must be fitted into the hook of the grate plate and passed through the opening in the grate carrier wall and then secured by means of a nut and a lock nut, at a location to which access is difficult. The assembly operation is made more difficult in particular by the fact that it has to be carried out from below, that is to say it has to be done 'overhead'. Added to that is the fact that, in particular when dealing with repair operations on installations which are already in use, that working area is extremely dirty and, generally just after the installation has been shut down, is also extremely hot, so that, to avoid the assembly personnel suffering from health damage, it is necessary to wait for cooling-down times to elapse and cleaning operations have to be accepted. A further disadvantage is that the hook disposed at the underside of the grate plate is generally not castable so that it must be fixed to the generally cast grate plates, in a separate working operation.

The journal 'Zement-Kalk-Gips', No 4/1992 (45th annual edition), pages 171 ff, in particular FIG. 4, describes a grate plate arrangement for closed grate plates. The grate plates of a row are threaded on to transverse rods or bars, with openings provided in the side walls of the grate plates; the transverse rods or bars are engaged by hook-like tie anchors whose ends towards the grate carriers are passed through an opening in a grate carrier bottom wall and secured by means of a nut which can be screwed on to that end. In relation to this grate plate arrangement also assembly is made difficult by virtue of the fact that the transverse rods or bars to which the tie anchors must be connected are at inaccessible locations into which it is difficult to see so that the assembly operation requires a very great deal of experience. In addition there is also the problem here that the assembly operations have to be carried out overhead and, particularly when dealing with repair operations on installations which are already in use, they have to be performed under hot dirty working conditions. A further disadvantage is that the bending strength of such transverse rods or bars, if of reasonable cross-sectional dimensions, is generally not sufficient to reliably safeguard the grate plates from being lifted off.

The object of the present invention is to provide a secure and reliable grate plate arrangement of the kind having a plurality of side-by-side grates fixed on a grate carrier by a clamping device which permits assembly which is considerably improved and simplified in comparison with the known constructions.

SUMMARY OF THE INVENTION

The clamping device includes at least one clamping element whose end which is towards the grate plate engages through an opening in the front end wall of the grate plate and is provided with clamping means which are actuable from the front end wall side. The clamping means envisaged are for example wedge or taper elements, eccentric toggles, screw elements or the like. The end of the clamping element, which is towards the grate carrier, is provided with suitable anchoring means which permit a force-transmitting connection to the grate carrier, as is described in greater detail with reference to the specific embodiments.

After the grate plates have been fitted on to the grate carrier the fitter can tighten the clamping elements from above, that is to say from the top side of the grate. As a result, he has working conditions which are considerably better than in the case of the known constructions so that he can perform the assembly operation substantially more quickly and more accurately. Besides the rationalisation effect this gives a considerable advantage for the assembly personnel, in terms of maintaining of industrial health and safety standards, as the operation of tightening the clamping means no longer has to be carried out in a particularly tiring position overhead. The function of the grate is in no way adversely impaired by the parts of the clamping devices which project beyond the end wall, as tests have shown. In addition, it is readily possible for the end which is towards the grate plate, with the clamping means co-operating therewith, to be disposed in countersunk relationship in the end wall of the grate plate. Grate plates of that kind can then be readily used for flat grates in which grate plates which are disposed one behind the other bear directly against each other.

The clamping elements can in principle be pressure or spreader elements which can be spread between the end wall of the grate plate and the grate carrier and in that case clamp the grate plate relative to the grate carrier in a forward direction against suitable contact surfaces, or tension elements which pull the grate plate relative to the grate carrier in a rearward direction against suitable contact surfaces.

Numerous different design configurations can be conceived for the clamping devices. In a particularly simple design configuration, the anchoring means are integrated with the clamping element to form a component, as for example in the case of a tie anchor in accordance with the state of the art; in other design configurations it is provided that the anchoring means are in the form of separate components which can be force-transmittingly connected to the clamping element, as will also be set forth hereinafter with reference to specific embodiments.

When using a clamping element in the form of a tension element, the anchoring means preferably include at least one hook engaging behind a holding edge provided on the grate carrier. The actual clamping element is preferably a simple inexpensive screw bolt which can be tightened by way of a screw head provided at its end towards the grate plate, or a screw nut which can be screwed on to that end.

In accordance with a further embodiment of the invention, in the case of closed grate plates, it is provided that the bottom plate which at least partially covers over the underside of the grate plate is part of the clamping device; it is a separate component which is longitudinally displaceably arranged at the underside of the grate plate and at its end towards the grate plate it is provided with at least one clamping element while at its end towards the grate carrier it is provided with anchoring means. The bottom plate can be integrated with side walls of the box-like grate plate to form a component which is approximately U-shaped in cross-section; another embodiment of the invention provides that the side walls are arranged on the grate plate itself and that the bottom plate is longitudinally displaceably mounted in longitudinal guides provided in the side walls. In a particularly simple construction, the bottom plate can be sealingly applied from below against guide bars arranged at the insides of the side walls and the end wall.

A further embodiment provides that the bottom plate has a hook at its end towards the grate carrier while in the region of its end towards the grate plate it has a flange for force-transmitting engagement of a tension element. In a particularly simple embodiment, the bottom plate itself is bent over in a hook-like configuration at its end towards the grate carrier.

In modern grate constructions the grate carrier is substantially box-like with front and rear grate carrier walls arranged transversely relative to the longitudinal direction of the grate plate; for that situation, the anchoring means preferably each engage the front grate carrier wall. In the assembled condition, the grate plate lies at least on the front grate carrier wall and is pressed with a rear wall against the rear grate carrier wall. The rear wall of the grate plate on the one hand and the rear grate carrier wall on the other hand are preferably provided with co-operating profiles which hold the grate plate at least in the heightwise direction. In a preferred embodiment of the invention those profiles are in the form of guide profiles which extend transversely relative to the longitudinal direction of the grate plate and which permit a transverse movement of the grate plate, for example as a result of thermal expansion, while however preventing the grate plate from lifting away from the grate carrier. In that case the clamping devices are preferably only tightened to such an extent that the grate plates are only positively lockingly held on the grate carrier, so that transverse displacement is still possible, without involving high forces.

A further embodiment of the invention provides that the guide profiles have operative surfaces which co-operate in a wedge-like cross-sectional configuration, in such a way that, when the clamping elements are tightened, the grate plate is clamped on to the grate carrier. Similarly thereto for example hooks which engage over the top edge of a box-like grate carrier, on the one hand, and that top edge on the other hand, also have operative surfaces which co-operate in a wedge-like manner and which, when the clamping elements are tightened, clamp same and therewith also the grate plate in a downward direction.

In order to guarantee defined clamping forces, a further embodiment of the invention provides that the clamping element is supported by way of a spring element against the end wall or against the grate carrier. In that way the clamping force remains in the range which is predetermined by the spring characteristic of the spring element. In the case of a clamping element which is in the form of a tension element, the spring element is preferably disposed between the front end wall side and the clamping elements; in a preferred configuration the spring element is an end plate which comprises a resilient material and which bears by way of spacers against the end wall and through which the tension element engages. Flexing of that end plate is a measurement in respect of the clamping force, which can also be easily determined at the point of assembly.

In a further embodiment of the invention it is provided that the width of the end plate at least corresponds to the width of the grate plate, and that the end plate is provided with a slot extending in the heightwise direction for the tension element to pass therethrough. That configuration affords the possibility of adjusting the end plate in the heightwise direction and in that way adjusting calibration of the pusher gap which is formed between the lower edge of the end plate and the top side of the grate plate which is disposed therebeneath. In order to facilitate displacement of the end plate in the vertical direction, preferably the end plate and the end wall are provided with co-operating guide profiles which extend in the heightwise direction and which exclude tilting movement of the end plate.

As has already been stated hereinbefore, the essential advantage of the present invention lies in assembly and dismantling of the grate plates being easier. In that way it is, in particular, also possible for individual damage or destroyed grate plates to be dismantled and replaced by fresh grate plates, at low cost. In order not to lose that advantage by virtue of the grate plates of a row being clamped together to form a bundle or array for example as in the case of the above-mentioned journal 'Zement-Kalk-Gips', it is further provided in accordance with the invention that in each case only individual adjacent grate plates, that is to say, for example two, three or a small group of juxtaposed grate plates, are connected together. In that way, for the purposes of replacing an individual grate plate, only the lateral connections to a few other grate plates have to be released and re-made after a new grate plate has been fitted in place. A further configuration according-to the invention provides that the means for connecting individual adjacent grate plates are formed by a bottom plate which is respectively common to those grate plates. That bottom plate may for example engage in an approximately clip-like configuration over the associated group of grate plates and in that way connect them together in the transverse direction.

When using grate plates in which the actual grate surface is formed by slat portions which can be inserted one behind the other between side limb portions, for example in accordance with EP 0 549 816 Al, it is similarly provided that the means for laterally connecting individual grate plates together are formed by slat portions which are respectively common to those grate plates. The slat portions are in turn of such a configuration that they engage clip-like over the grate plates which are to be laterally connected together. A particularly desirable configuration is provided if the slat portions which respectively cover over a plurality of grate plates are displaced in rows relative to each other in the manner of brickwork. That arrangement makes it possible for the grate plates of a row of grates to be clamped together to form a bundle or array on the one hand, while on the other hand individual grate plates or groups thereof can be separated from the other grate plates without having to loosen the entire assembly.

BRIEF DESCRIPTION OF DRAWINGS

A number of embodiments of the invention are described in greater detail hereinafter and illustrated in the drawing in which.

DETAILED DESCRIPTION

Figure 1:
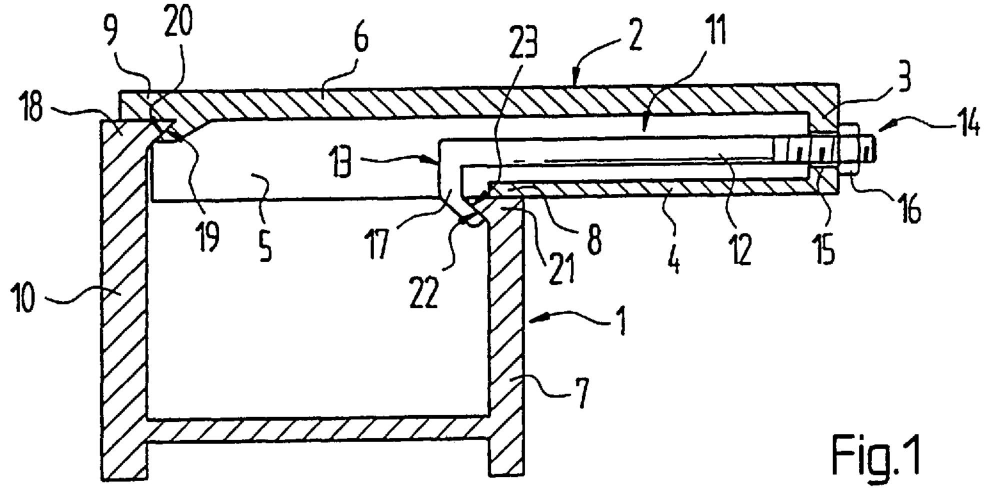
FIG. 1 is a diagrammatic view in cross-section of a box-like grate carrier with grate plate fitted thereon and with a clamping device in the form of a one-piece tie anchor.

FIG. 1 shows a grate carrier 1 which in per se known manner is in the form of an air feed duct or passage and which extends in the transverse direction of the grate. A plurality of grate plates 2 are arranged in side-by-side relationship on the grate carrier 1 to form a row of grates. The grate plates 2 are so-called closed grate plates, that is to say in the present embodiment they have an end wall 3, a bottom wall 4 and side walls of which only one side wall 5 is to be seen in FIG. 1. The grate plate 2 is closed rearwardly by the rear wall 10 of the grate carrier 1. At their underside the grate plates 2 communicate with the air-carrying grate carrier 1 by way of a rear region which is not covered by the bottom wall 4. The cover or top wall 6 of the grate plate 2, which forms the actual grate surface, is provided in per se known manner which is therefore not shown in greater detail herein with blowing openings, preferably obliquely forwardly inclined blowing slots.

The grate plate 2 is supported with its side walls 5 on the front wall 7 of the grate carrier 1, with the rear edge 8 of the bottom wall 4 lying sealingly on the top edge 21 of the front wall 7. The rear edge 9 of the top wall 6 lies sealingly on the top edge 18 of the rear wall 10 of the grate carrier 1.

For the purposes of fixing the grate plate 2 on the grate carrier 1, there is provided a clamping device 11 which includes a clamping element 12 and anchoring device or means 13. In the embodiment shown in FIG. 1, the clamping element 12 and the anchoring means 13 are integrated to form an integral component. The clamping element 12 is a screw pin or bolt whose end 14 which is towards the grate plate extends through an opening 15 in the front end wall of the grate plate 2; the end 14 which is towards the grate plate is provided with an external screw thread on to which a screw nut 16 can be screwed. The clamping element 12 extends generally parallel to the top wall of the grate plate. The anchoring means 13 are formed by a hook 17 which is provided at the end of the screw pin or bolt that is towards the grate carrier, the hook 17 engaging behind the top edge of the front wall 7 of the grate carrier 1.

For assembly of the grate plate 2, it is laid on to the grate carrier 1 and the clamping device 11 which is still in the untightened condition is loosely hung on the front wall 7. The hook 17 is drawn against the front wall 7 by tightening the screw nut 16, in which case the grate plate 2 is pushed rearwardly to bear against the rear wall 10. As FIG. 1 shows, the top edge 18 of the rear wall 10 on the one hand and the rear end of the grate carrier, that is to say the rear edge 9 of the top wall 6 on the other hand, are provided with co-operating profiles to permit transverse movement of the grate plates 2 relative to the grate carrier 1 but prevent the grate plates 2 from lifting off. In the illustrated embodiment those profiles have operative surfaces 19 and 20 respectively which co-operate in a wedge-like cross-sectional configuration and which, when the clamping device 11 is tightened, produce a force which clamps the grate plate 2 on to the grate carrier 1.

Similarly thereto the top edge 21 of the front wall 7 on the one hand and the hook 17 of, the clamping device 11 on the other hand are provided with operative surfaces 22 and 23 respectively which co-operate in a wedge-like manner and which, when the clamping device 11 is tightened, produce a force which clamps same and the grate plate 2 connected thereto downwardly on to the grate carrier 1.

The clamping means of the clamping element 12, that is to say the screw nut 16 which can be screwed on to the screwthread of the screwthreaded pin or bolt, is accessible from the top side of the grate so that assembly of the grate plates 2 on the grate carrier 1 can be effected under favourable working conditions, as has already been explained above.

Figure 2:
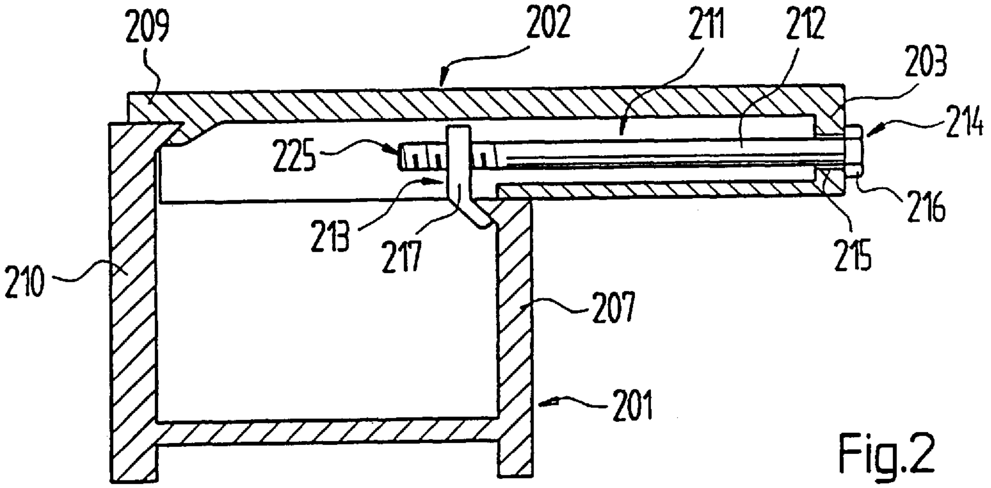
FIG. 2 is a view corresponding to FIG. 1 but in which the clamping device is composed of a clamping element and anchoring means.

FIG. 2 shows an embodiment which differs from that shown in FIG. 1 essentially only by virtue of the configuration of the clamping device 211. In this case the clamping element 212 which is in the form of a screw pin or bolt and the anchoring means 213 in the form of the hook 217 are separate components. The clamping element or screw bolt 212 projects with its end 214 that is towards the grate plate through an opening 215 in the front end wall 203 of the grate plate 202 and at that end carries a screw head 216. The end 225 of the screw bolt 212, which is towards the grate carrier, is provided with an external screwthread which can be screwed into a screwthreaded bore in the hook 217.

By tightening the screw bolt 212, the hook 217 is drawn against the front wall 207 and the grate plate 202 is pressed with its rear edge 209 against the rear wall 210 of the grate carrier 201.

The embodiments shown in FIGS. 1 and 2 correspond to modern grate structures with closed grate plates, wherein the cooling air is fed substantially only by way of the grate carriers which are in the form of air guide passages or ducts, and the grate plates which are sealingly mounted thereon.

Figure 3:
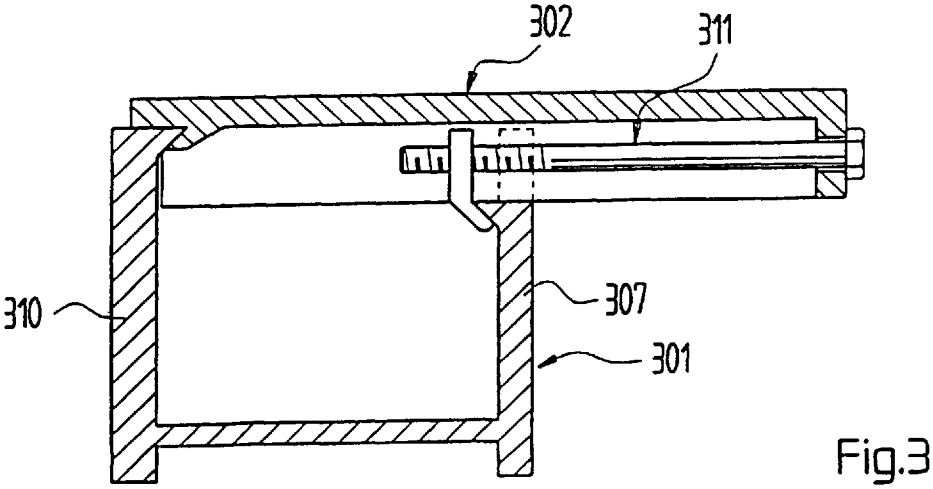
FIG. 3 is a view corresponding to FIG. 2 but with a downwardly open grate plate.

FIG. 3 shows an embodiment which differs from that shown in FIG. 2 in that the grate plate 302 is an open grate plate. In the present case it does not have a bottom wall so that it is not sealed off relative to the grate carrier 301. In this case the cooling air is fed to the grate plates 303 by way of an air chamber which is common to a respective plurality of grate rows or to the entire grate, as is known per se. The side walls are usually also omitted, in the case of open grate plates. In this case the front wall 307 which extends as far as the height of the rear wall 310 directly supports the grate plate 302 and the clamping device engages through an opening provided in the front wall 307, as is shown in broken line in FIG. 3.

The clamping device 311 corresponds in all its details to the clamping device 211 shown in FIG. 2 so that it does not need to be described once again here.

Figure 4:
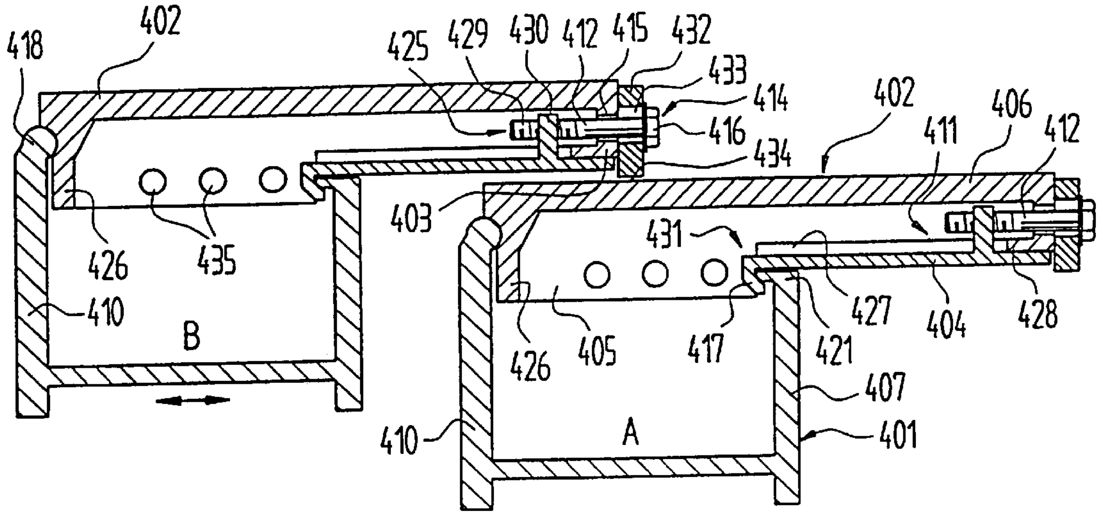
FIG. 4 is a view in cross-section of two rows of grates which overlap in a step-like configuration, with closed grate plates, wherein the bottom wall is part of the clamping device in each case.

FIG. 4 shows two grate rows which each include a grate carrier and grate plates arranged thereon. The arrangement A shown at the right in FIG. 4 is for example a fixed grate row while the arrangement B shown at the left is a movable row of a pusher grate. In other respects both arrangements are identical.

A plurality of grate plates 402 forming a grate row are mounted in side-by-side relationship on the grate carrier 401 which is in the form of the air guide passage or duct. The grate plates 402 are closed grate plates with a top or cover wall 406, a front end wall 403, side walls 405 of which only one is to be seen in each case in FIG. 4, a rear wall 426 and a bottom wall 404.

As can be seen in particular also in regard to the grate plate in FIG. 5 which is of a similar construction in that respect, the bottom wall 404 is a separate component which is applied from below against guide bars 427 and 428 respectively which are provided at the insides of the side walls 405 and the end wall 403 respectively, the above-mentioned separate component bearing with its rear end edge against support noses arranged at said insides (see the support noses 545 in FIG. 5).

The bottom wall 404 is at the same time part of the clamping device 411 by which the grate plate 402 is fixed to the grate carrier 401. The clamping device 411 also includes a screw pin or bolt which serves as a clamping element 412 and which co-operates with the bottom wall 404. At its end 414 which is towards the grate plate and which extends through an opening 415 in the front end wall 403, the screw bolt carries a screw head 416 while at its end 425 which is towards the grate carrier it has a screwthread 429. At its top side the bottom plate 404 carries a flange 430 which is perpendicular thereto, with a screwthreaded bore into which the screw bolt 412 can be screwed. At its end 431 towards the grate carrier, the bottom plate 404 is bent over downwardly to form a hook 417 which engages over the top edge 421 of the front wall 407 of the grate carrier 401.

The bottom wall 404 is drawn against the front wall 407 of the grate carrier 401 by tightening of the screw bolt 412 so that the grate plate 402 is pressed with its rear wall 426 against the rear wall 410 of the grate carrier 401.

As FIG. 4 shows the top edge 418 of the rear wall 410 on the one hand and the rear wall 426 of the grate plate 402 on the other hand are provided with co-operating guide profiles which permit transverse displacement of the grate plate 402 on the grate carrier 401 but prevent the grate plate 402 from lifting off.

Figure 5:
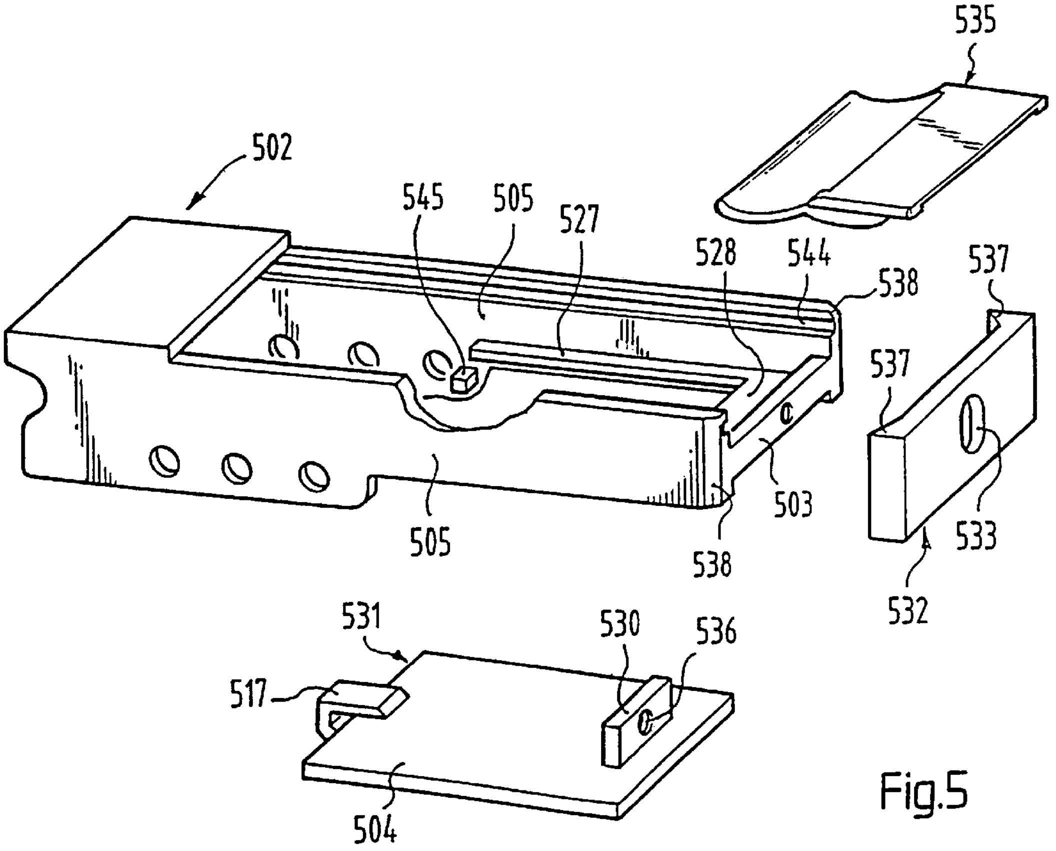
FIG. 5 is a perspective view of details of a grate plate approximately as shown in FIG. 4; in that arrangement the actual grate surface is formed by slat portions which can be inserted between side limb portions.

The hook 417 on the one hand and the top edge 421 of the front wall 407 of the grate carrier on the other hand are again provided, as in the case of FIGS. 1 to 3, with operative surfaces which co-operate in a wedge-like manner and which, when the screw bolt 412 is tightened, produce a force which pulls the bottom wall 404 downwardly against the grate carrier and which is transmitted to the grate plate 402 by way of the support noses arranged at the insides of the side walls (see the support noses 545 in FIG. 5).

As FIG. 4 further shows arranged between the screw head 416 of the screw bolt 412 and the front end wall 403 of the grate plate 402 is a respective end plate 432. The end plate 432 is provided with a slot 433 which extends in a vertical direction and through which the screw bolt 412 engages. The width of the end plate 432 corresponds to the width of the end wall 403 while the height of the end plate at least approximately corresponds to the height of the end wall. As FIG. 4 shows the pusher gap 434 relative to the top side of the respective next step can be exactly calibrated by vertical displacement of the end plate 432.

The openings 435 in the side walls 405 serve to interconnect, for example by means of screws, respective grate plates 402 which are arranged side-by-side.

FIG. 5 shows a grate plate 502 approximately as shown in FIG. 4. The top or cover wall 406 which is only diagrammatically illustrated in FIG. 4 is replaced in the embodiment of FIG. 5 by individual plate or slat portions 535 which are successively inserted into guide grooves 544 provided at the insides of the side walls 505, and arranged in such a way that blowing slots remain between the plate or slat portions 535. The last plate or slat portion (not shown here) closes off o the grate plate in a forward direction and is suitably fixedly connected thereto, as will be described hereinafter.

As in the embodiment of FIG. 4 the bottom wall 504 is a separate component which is applied from below against guide bars 527 and 528 respectively which are provided at the insides of the side walls 505 and the front end wall 503 respectively. In addition the bottom plate 504 lies with its front end 531 on the support noses 545 arranged at the insides of the side walls 505 so that the grate plate can be pulled downwardly by way of the bottom wall.

At its end 531 which is towards the grate carrier the bottom wall 504 is provided with a hook 517 which is intended to engage behind the top edge of the front wall of a grate carrier, as is illustrated in FIG. 4. Arranged on the top side of the bottom wall 504 is a flange 530 having a screwthreaded bore 536 into which a screw pin or bolt can be screwed. The screw pin or bolt can bear by means of a screwthread head from the outside directly or with the interposition of an end plate 532 against the end wall 503.

The end plate or spring element 532 is provided with a slot 533 which extends in the vertical direction and which permits vertical displacement of the end plate 532 in the manner already described above. The end plate 532 is also provided with lateral guide profiles 537 which extend in the vertical direction and which co-operate with corresponding guide profiles 538 provided at the end 503 of the grate plate 502, in such a way that the end plate 532 bears against the end 503 at a spacing without involving a tilting movement but allowing vertical displacement.In that way, by virtue of vertical displacement of the end plate 532, it is possible to set an accurately calibrated pusher gap which is exactly parallel to the top side of the next step.

Figure 6:
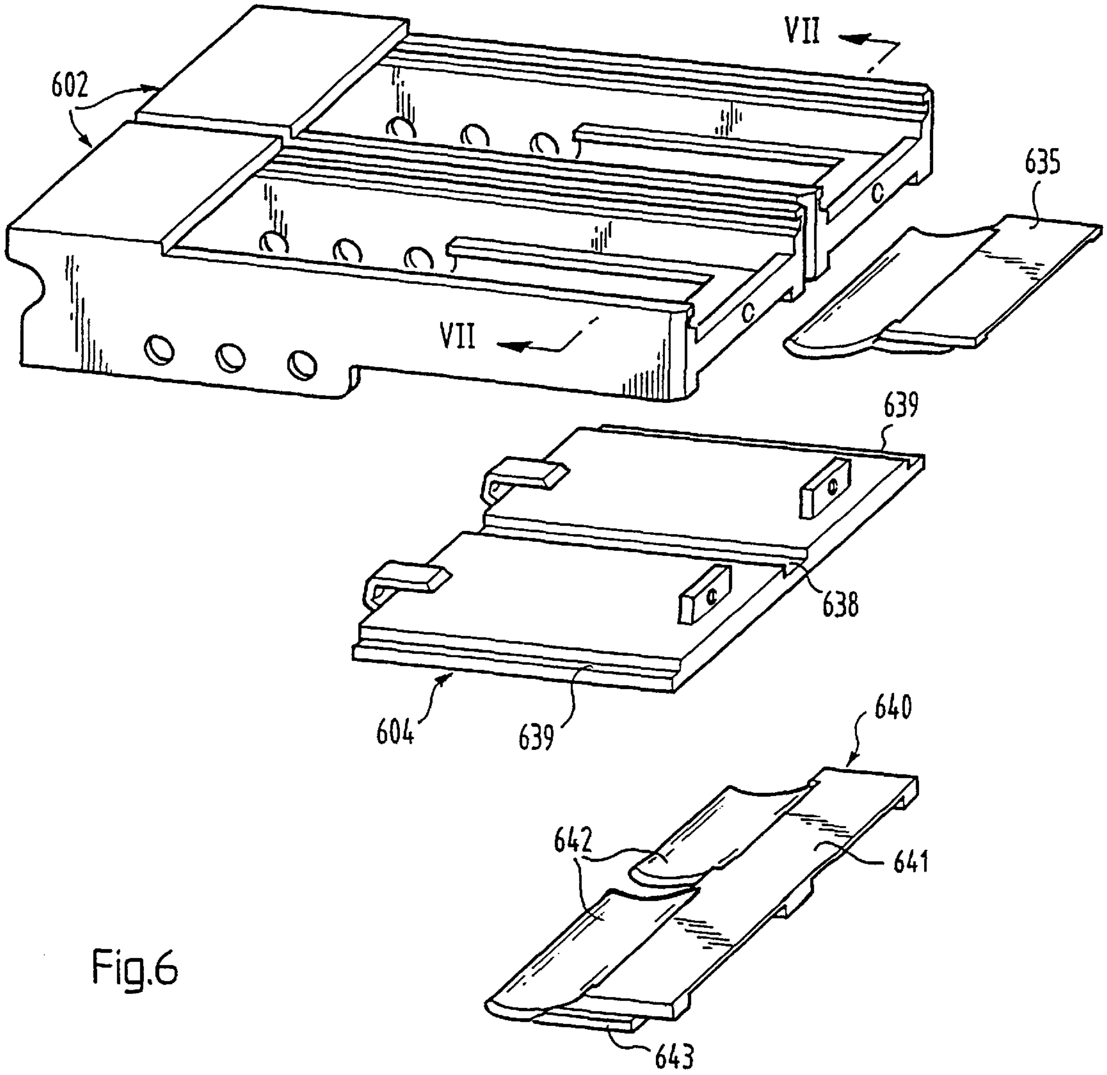
FIG. 6 is a perspective view of two grate plates approximately as shown in FIG. 5 with details of the grate plate structure.
Figure 7:
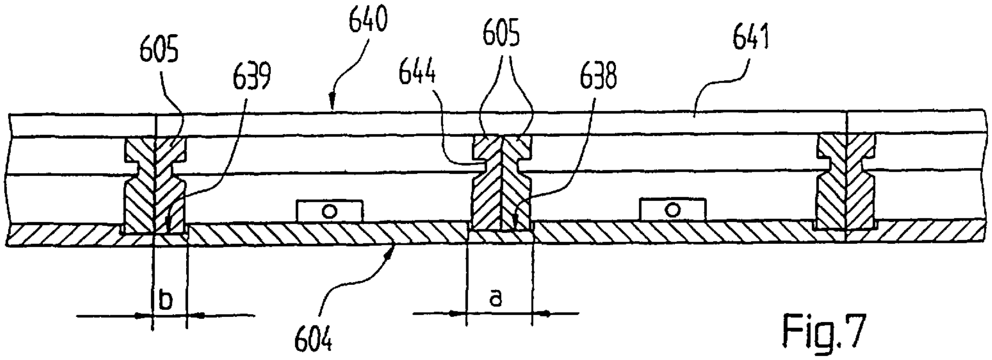
FIG. 7 is a view in cross-section through a grate plate arrangement approximately as shown in FIG. 6 taken along line VII—VII.

In order not to lose the advantage of ease of assembly and dismantling of individual grate plates by virtue of the fact that all grate plates of a row are clamped together to form a stack or array, it is provided that in each case only individual grate plates which are arranged in side-by-side relationship or small groups of grate plates which are arranged in side-by-side relationship are connected together. It has already been explained with reference to FIG. 4 that this can be effected by means of pins or bolts which are fitted through openings 435 in the side walls. It can be readily seen however that such pins or bolts must be fitted at locations to which access is poor, and that involves the disadvantages already discussed above. FIG. 6 shows two identical grate plates 602 which are arranged in side-by-side relationship and which correspond to the grate plate 502 described with reference to FIG. 5. The bottom wall 604 which is in the form of a separate component is of a width which is sufficient to cover over two grate plates 602 which are arranged side-by-side. As FIGS. 6 and 7 show the bottom wall 604 has a central groove 638 extending in the longitudinal direction, and two lateral rabbets 639. The central groove 638 is of a width "a" which corresponds to the width of two side walls 605, which bear against each other, of two grate plates 602 which laterally bear against each other. The lateral rabbets 639 are of a width "b" which corresponds to the width of a side wall 605. The bottom wall 604 is fitted from below in the manner shown in FIG. 7 to two grate plates 602 which are arranged side-by-side, in which case the central groove 638 engages over the two side walls 605, which bear against each other, of the two grate plates, and joins them together.

In that way, for the purposes of dismantling an individual grate plate, it is only necessary to release the clamping devices of that grate plate and the grate plate which is connected thereto by way of the common bottom plate, in order to lift off the grate plate to be dismantled in an upward direction and replace it by a fresh grate plate.

Another possible way of connecting together two or even more grate plates which are arranged laterally side-by-side, of the kind shown in FIG. 6, provides that the individual plate or slat portions 635 are replaced by plate or slat portions which cover over two or more grate plates and connect them together in the manner of a clip. FIG. 6 shows a double plate or slat portion 640, the width of which is sufficient to cover over two grate plates which are arranged in side-by-side relationship. Similarly to the plate or slat portion 635, the portion 640 comprises a top or cover plate 641 which forms the actual grate surface and which lies on the top edges of the side walls 605, and two projections 642 which project downwardly between the respective side walls 605 of two grate plates 602 and which each engage under the top or cover plate of the next double plate or slat portion. Laterally arranged on the projections 642 are bar portions 643 which engage into guide grooves 644 provided at the insides of the side walls 605. The projections 642 of the double portion 640 laterally embrace the two side walls 605, which bear against each other, of the two adjacent grate plates 602, and hold them together. For removal of a grate plate therefore only the double plate or slat portions associated therewith have to be removed and the associated clamping devices released.

Figures 8, 9:
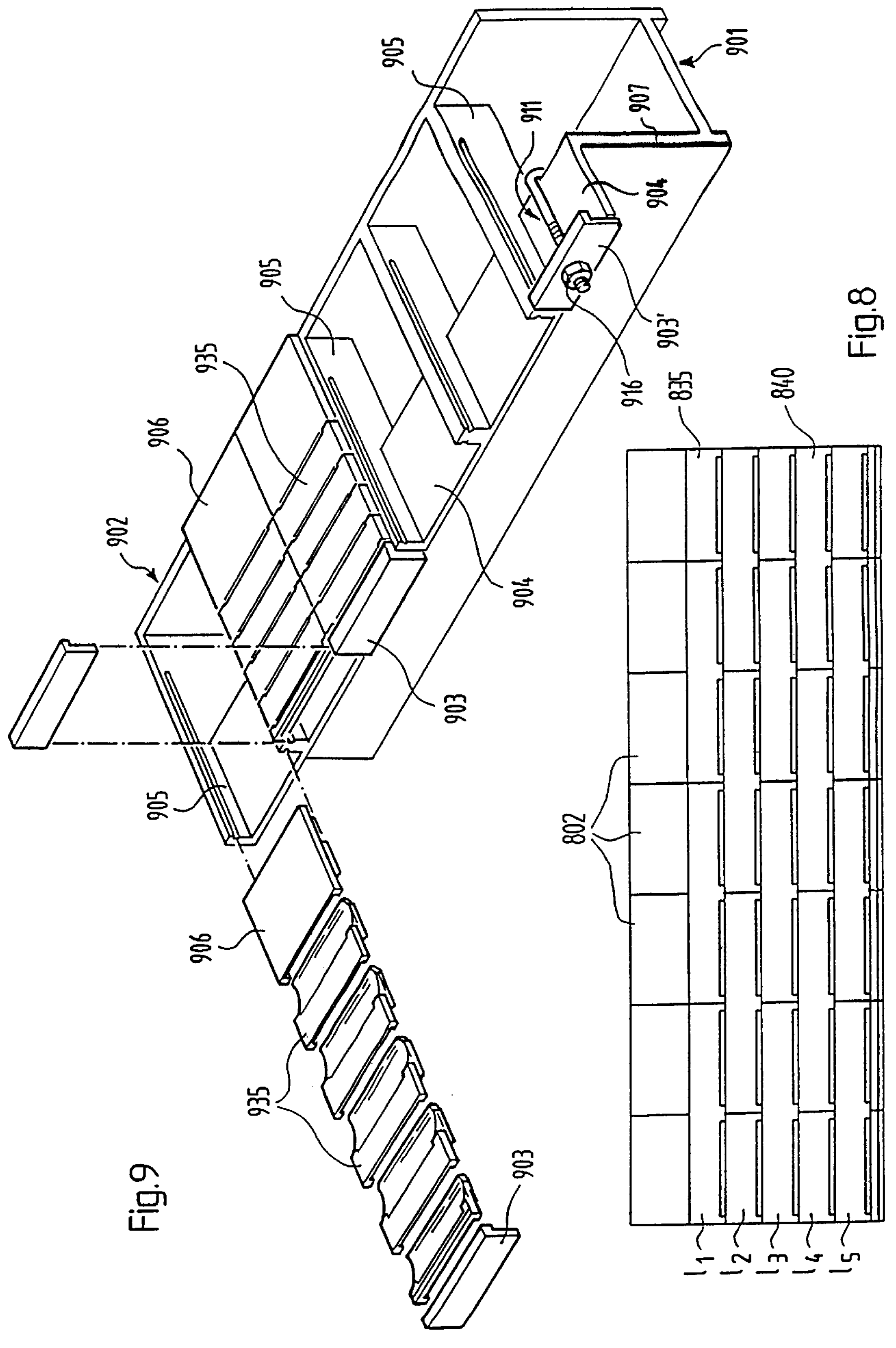
FIG. 8 is a plan view of a row of grates of a structure approximately as shown in FIG. 7.
FIG. 9 shows a grate beam array forming a row of grates with an integral connection of the grate plates to the grate carrier, the actual grate surface being formed by slat portions which can be inserted between side limb portions of the grate plates.

So that the grate plates of a row can be connected together to form a unit or array without the entire assembly having to be released for dismantling of individual grate plates, an arrangement as shown in FIG. 8 is provided. FIG. 8 shows a grate row with a plurality of grate plates 802 which are arranged in side-by-side relationship. The actual grate surface, as in the embodiment of FIGS. 6 and 7, is formed by double plate or slat portions 840 and individual plate or slat portions 835 at the side edge. It will be seen that the slat or plate portion rows 11 to 15 which are arranged one behind the other are laterally displaced relative to each other by the width of a respective plate or slat portion 835, in the manner of brickwork. In that way, there is produced a composite assembly which locks together all grate plates 802 of a row.

FIG. 9 shows a grate row structure in which a grate carrier 901 in the form of an air guide passage or duct is combined with the bottom walls 904 and the side walls 905 to form an integral component. This structure is completed to afford an operational grate beam or array by virtue of the fact that a rear cover wall 906 and a plurality of plate or slat portions 935 are inserted between each two side walls 905. In the case of the box which is at the left in FIG. 9 and which performs the function of a grate plate 902 the front end wall 903 is formed by a closure plate which is inserted from above into vertical guide grooves provided at the insides of the side walls 905.

In accordance with the present invention the front end wall 903' may be applied against the front end faces of the side walls 905 and clamped fast by means of a clamping device 911. In the illustrated embodiment, the clamping device 911 is of a configuration corresponding to the clamping device 11 shown in FIG. 1. It comprises a screw pin or bolt whose free end which passes through an opening in the front end wall 903' carries a screwthread on to which a screw nut 916 can be screwed. The rear end of the screw pin or bolt is bent over in a hook-like configuration and engages behind the front wall 907 of the grate carrier 901.

I claim:

1. A grate plate arrangement for step grates, comprising a plurality of grate plates laid in a side-by-side arrangement on a grate carrier, the grate plate having a top wall extending in a first direction between front and rear edges, and a front end wall extending generally transversely to the first direction and from the front edge of the top wall, an upper surface of the top wall being adapted to support material to be treated, the front end wall having means defining an opening therethrough, a clamping device fixing the grate plates to the grate carrier, the clamping device including at least one clamping element having first and second ends, the first end being toward the front end wall of the grate plate, the second end being toward the grate carrier, the clamping element extending through the opening in the front end wall, a clamping actuation device mounted to the first end on a side of the front end wall remote from the grate carrier, and an anchoring device mounted to the second end, the clamping actuation device being adapted to actuate the clamping element to urge the rear edge of the top wall against a rear portion of the grate carrier and to urge the anchoring device against a front portion of the grate carrier thereby fixing the grate plate on the grate carrier.

2. The grate plate arrangement according to claim 1, wherein the anchoring device and the clamping element are integrated into a single component.

3. The grate plate arrangement according to claim 1, wherein the grate carrier has a holding edge, the anchoring device includes at least one hook urged against the holding edge in response to the clamping element.

4. The grate plate arrangement according to claim 1, wherein the clamping element is a screw bolt having one of a screw head and a screw nut attached to the first end on said front end wall of the grate plate remote from the grate carrier.

5. The grate plate arrangement according to claim 1, wherein an end plate contacts against a front side of the front end wall remote from the grate carrier and is adjustable in height, and a lower edge of the end plate projects beneath an underside of the grate plate.

6. The grate plate arrangement according to claim 1, wherein each grate plate has a slat portion, an end plate is fitted to the front end of a grate plate and holds the slat portions, the end plate having means defining an opening therein, the first end of the clamping element engages the end plate through the opening in the end plate, the clamping actuation device acting on said first end, and the second end being anchored to the grate carrier to hold the grate plate to the grate carrier.

7. The grate plate arrangement according to claim 1, wherein the clamping device includes a bottom wall which at least partially covers an underside of the grate plate and which is arranged longitudinally displaceably thereon, the bottom wall having a third end adjacent the the grate plate, the third end being connected to at least one clamping element, the bottom wall having a fourth end adjacent the grate carrier, the fourth end being connected to anchoring device.

8. The grate plate arrangement according to claim 7, wherein the grate plate has side walls, the side walls having longitudinal guides thereat, and the bottom wall is longitudinally displaceably mounted in the longitudinal guides provided at the side walls.

9. The grate plate arrangement according to claim 8 the guides are guide bars mounted onto the inside of the side walls and front end wall, wherein, the bottom wall sealingly contact from below against guide bars.

10. The grate plate arrangement according to claim 7, wherein a hook is mounted at the fourth end, and a flange is mounted adjacent the third end for force-transmitting engagement of the clamping element.

11. The grate plate arrangement according to claim 10, wherein the bottom wall has a hook-like bend therein at the fourth end defining the hook.

12. The grate plate arrangement according to claim 1, wherein the grate carrier has a substantially box-like configuration with front and rear grate carrier walls which extend transversely to the longitudinal direction of the grate plate, the grate plate being laid on the front and rear grate carrier walls, and the anchoring device engages a side of the front grate carrier wall remote from the front end wall.

13. The grate plate arrangement according to claim 12, wherein the anchoring device has hooks, the hooks contacting behind a top edge of the front grate carrier wall.

14. The grate plate arrangement according to claim 13, wherein the hooks and the top edge of the front grate carrier wall have operative surfaces which co-operate in a wedge configuration so that when the clamping elements are tightened the hooks are pulled on to the front grate carrier wall.

15. The grate plate arrangement according to claim 12, wherein the grate plate lies at least on the front grate carrier wall, and the rear edge presses against the rear grate carrier wall.

16. The grate plate arrangement according to claim 15, wherein the rear edge and the rear grate carrier wall have co-operating profiles which determine the relative position of the grate plate and the grate carrier.

17. The grate plate arrangement according to claim 16, wherein the profiles are guides which extend transversely relative to a longitudinal direction of the grate plates and the guides permit movement of the grate plate transverse to the longitudinal direction thereof and prevent the grate plate from lifting away from the grate carrier.

18. The grate plate arrangement according to claim 17, wherein the guides have operative surfaces which co-operate in a wedge configuration so that when the clamping elements are tightened by operation of the actuation device, the grate plate is pulled on to the grate carrier.

19. The grate plate arrangement according to claim 1, wherein a spring element urges the clamping element against one of the front end wall and the grate carrier.

20. The grate plate arrangement according to claim 19, wherein the clamping element is a tensioning element, and the spring element is a resilient end plate having spacers urging against the end wall.

21. The grate plate arrangement according to claim 20, wherein the width of the end plate corresponds to the width of the grate plate, and the end plate has a slot extending in a heightwise direction, the tensioning element extending through the slot.

22. The grate plate arrangement according to claim 21, wherein the end plate and the front end wall have cooperating guide profiles which extend in the heightwise direction.

23. The grate plate arrangement according to claim 1, wherein the grate plates which are arranged in side-by-side relationship and which form a grate row are connected by means for connecting respective individual adjacent grate plates forming the grate row.

24. The grate plate arrangement according to claim 23, wherein the means for connecting individual adjacent grate plates are formed by a respective bottom wall of the grate plates, and the bottom wall being a separate component and being longitudinally displaceably mounted on the grate plates.

25. The grate plate arrangement according to claim 23 wherein each of the grate plates has a slat portion and a side limb portion, the slat portions forming the actual grate surface and being inserted one behind the other between the side limb portions, and adjacent slat portions respectively define a blowing slot, and the means for connecting individual grate plates together are formed by multiple slat portions.

26. The grate plate arrangement according to claim 25, wherein the multiple slat portions which cover over a plurality of grate plates are respectively arranged in rows in a laterally mutually displaced relationship.

27. The grate plate arrangement according to claim 1, wherein said clamping element extends generally parallel to said top wall.

28. In a grate plate arrangement for treatment of bulk materials, a plurality of grate plates arranged longitudinally and side-by-side, a grate carrier supporting the plurality of grate plates, the grate carrier having first and second upright walls, each said grate plate comprising:

a horizontally extending top wall having front and rear end portions, said rear end portion being releasably urged against said first upright wall of said grate carrier, a front wall extending downwardly from said top wall front end portion, the front wall having means defining an opening therein, an elongate clamping device having first and second ends, said clamping device being received in said opening, said first end extending beyond said front wall remote from said grate carrier, said second end having an anchoring device connected thereto, said anchoring device being releasably urged against a side of said second upright wall remote from said front wall, an actuation device received on said first end for actuating said clamping device to releasably fix said grate plate to said grate carrier, whereby in response to actuation of said actuation device said clamping device moves said front wall rearwardly and urges said top wall rear end portion against said first upright wall of said carrier grate and urges said anchoring device forwardly against said second upright wall so that said grate plate is longitudinally fixed to said grate carrier.

* * * * *